(12) United States Patent
Wappling et al.

(10) Patent No.: US 8,565,912 B2
(45) Date of Patent: Oct. 22, 2013

(54) PICK AND PLACE

(75) Inventors: Daniel Wappling, Vasteras (SE); Steve Murphy, Hovas (SE)

(73) Assignee: ABB Technology Ltd. (CH)

( * ) Notice: Subject to any disclaimer, the term of this patent is extended or adjusted under 35 U.S.C. 154(b) by 5 days.

(21) Appl. No.: 13/416,338

(22) Filed: Mar. 9, 2012

(65) Prior Publication Data

US 2012/0165972 A1 Jun. 28, 2012

Related U.S. Application Data

(63) Continuation of application No. PCT/EP2009/061786, filed on Sep. 11, 2009.

(51) Int. Cl.
*G06F 7/00* (2006.01)

(52) U.S. Cl.
USPC .............................. 700/217; 209/629; 706/13

(58) Field of Classification Search
USPC .......................................................... 700/217
See application file for complete search history.

(56) References Cited

U.S. PATENT DOCUMENTS

| | | | | |
|---|---|---|---|---|
| 5,041,907 | A * | 8/1991 | Sager et al. ...................... | 348/91 |
| 5,390,283 | A * | 2/1995 | Eshelman et al. ............... | 706/13 |
| 6,104,965 | A | 8/2000 | Lim et al. | |
| 6,122,895 | A * | 9/2000 | Schubert ........................... | 53/55 |
| 6,275,815 | B1 * | 8/2001 | Schaffer et al. .................. | 706/13 |
| 6,378,200 | B1 | 4/2002 | Lim et al. | |
| 6,804,580 | B1 | 10/2004 | Stoddard et al. | |
| 7,814,733 | B2 * | 10/2010 | Carlson et al. .................. | 53/472 |
| 7,966,094 | B2 * | 6/2011 | Ban et al. ........................ | 700/260 |
| 8,082,059 | B2 * | 12/2011 | Schaefer et al. ............... | 700/217 |
| 2003/0037515 | A1 | 2/2003 | Herzog | |
| 2003/0069666 | A1 | 4/2003 | Nagler | |
| 2004/0073322 | A1 * | 4/2004 | Maenishi et al. ................ | 700/28 |
| 2005/0075752 | A1 * | 4/2005 | Ban et al. ........................ | 700/213 |
| 2007/0108109 | A1 * | 5/2007 | Erlandsson-Warvelin et al. ............................. | 209/629 |
| 2007/0124927 | A1 * | 6/2007 | Konrath et al. .................. | 29/832 |
| 2008/0188973 | A1 | 8/2008 | Filev et al. | |
| 2011/0202164 | A1 * | 8/2011 | Weber ............................ | 700/112 |

FOREIGN PATENT DOCUMENTS

| CA | 2656304 A1 | 1/2008 |
|---|---|---|
| CH | 693710 A5 | 12/2003 |
| DE | 102006061571 A1 | 7/2008 |
| JP | 2008192785 A | 8/2008 |

OTHER PUBLICATIONS

International Preliminary Report on Patentability; Application No. PCT/EP2009/061786; Issued: Nov. 21, 2011; 10 pages.

(Continued)

*Primary Examiner* — Gene Crawford
*Assistant Examiner* — Kyle Logan
(74) *Attorney, Agent, or Firm* — St. Onge Steward Johnston & Reens LLC

(57) ABSTRACT

A pick and place system including at least one input conveyor, at least one output conveyor, at least one pick and place robot and control circuitry. Available picking positions on an input conveyor at which a respective item can be picked are determined as well as available placing positions on an output conveyor at which a respective item can be placed. For the available picking positions and the available placing positions, a respective picking time and placing time is calculated, and the at least one robot is instructed to pick items at the picking positions and place the items at the placing positions in an order determined by the respective picking times and placing times.

17 Claims, 5 Drawing Sheets

(56) References Cited

OTHER PUBLICATIONS

International Search Report and Written Opinion of the International Searching Authority; Application No. PCT/EP2009/061786; Issued: Apr. 23, 2010; Mailing Date: Jun. 2, 2010; 15 pages.

Written Opinion of the International Preliminary Examining Authority; Appliction No. PCT/EP2009/061786; Mailing Date: Sep. 2, 2011; 7 pages.

* cited by examiner

PICK AND PLACE

CROSS-REFERENCE TO RELATED APPLICATIONS

The present application is a continuation of pending International patent application PCT/EP2009/061786 filed on Sep. 11, 2009 which designates the United States and the content of which is incorporated herein by reference.

FIELD OF THE INVENTION

The present invention relates to pick and place systems and methods of controlling pick and place actions in such systems.

BACKGROUND OF THE INVENTION

The versatility and flexibility of industrial robots has increased significantly as a result of the development in the field of computer technology. A robot may be used for very different types of industrial tasks, including spot-welding components of a car as well as tasks that are commonly called pick and place. Pick and place tasks include picking up objects from a conveyor belt and placing them on a shipping pallet or in a shipping carton. A well known example is that of picking up chocolates from a conveyor belt, and placing them in a packing tray or a chocolate box.

A typical pick and place system comprises an input conveyor on which items are conveyed from an item source. The items are conveyed to a pick and place robot that picks the items up and places them on an output conveyor. The flow of items on the input conveyor, i.e. the number of items being conveyed per unit time, may vary to a small or great extent. Similarly, the ability for the output conveyor to receive items may also vary. For example, if the output conveyor slows down or even stops during a shorter or longer duration, it may become impossible for the pick and place robot to place items due to the fact that the output conveyor is already full of placed items within the placing range of the robot.

Such variations regarding item flow and availability of placing positions is a problem that needs proper attention when designing a pick and place system, in particular the way in which a pick and place robot is to operate in the system. Needless to say, this problem is even more complex when the pick and place system comprises a plurality of output conveyors and a plurality of pick and place robots.

Prior art patent application published as US 2007/0108109 describes a control method for machines in a pick and place system. It describes a system involving a plurality of robots controlled by a master process where information from a sensor about positions of items on an input conveyor is used to distribute pick and place tasks between the robots.

SUMMARY OF THE INVENTION

In order to improve on prior art solutions there is provided, according to a first aspect, a method in a pick and place system, the system comprising at least one input conveyor, at least one output conveyor, at least one pick and place robot and control circuitry, the method comprising determining available picking positions on an input conveyor at which a respective item can be picked, determining available placing positions on an output conveyor at which a respective item can be placed, calculating, for the available picking positions and the available placing positions, a respective picking time and placing time, and instructing the at least one robot to pick items at the picking positions and place the items at the placing positions in an order determined by the respective picking times and placing times.

That is, the problem of variations regarding item flow and availability of picking and placing positions is solved in that a calculation is made of picking and placing times, the calculation being dependent on the availability of both picking as well as placing positions. A determination is made of what items can be picked and in which order they are to be picked and to which place position the items will be placed. This is in contrast to prior art systems where only the availability of picking positions on the input conveyor is considered.

It is to be understood that the picking time and the placing time are calculated predictions of instants in time when picking and placing, respectively, is to take place.

The determination of available picking positions may comprise predicting picking positions based on a velocity of movement of the input conveyor and a performance measure of the pick and place system.

Similarly, the determination of available placing positions may comprise predicting placing positions based on a velocity of movement of the output conveyor and the performance measure of the pick and place system.

The performance measure of the pick and place system may be a picking and placing cycle time. A cycle time is an interval from an instant in time when picking takes place to an instant in time when placing takes place, or an interval from an instant in time when placing takes place to an instant in time when picking takes place. The cycle time may include a processing interval during which gripping or releasing an item takes place.

The method may further comprise the step of identifying groups of placing positions on the output conveyor, each group having a respective number of placing positions, and the determination of available placing positions may comprise, for each group of placing positions, checking whether a placing position within the group is unavailable and, if found to be unavailable, defining all placing positions within the group as unavailable.

Such embodiments address situations where no uncompleted boxes, i.e. a box being an example of a group of placing positions, on the output conveyor are allowed.

The checking whether a placing position within the group is unavailable may be performed only for groups having placing positions that are not already used. That is, the use of a position being defined as whether or not an item has been placed at the position.

In such embodiments, a box on which the robot is already working, i.e. a box in which at least one item has been placed, is not considered.

The method may comprise, wherein the system comprises a plurality of pick and place robots, each robot being associated with a respective output conveyor, calculating, for each robot, a value representing a need for items to be placed, for each item on the input conveyor, assign a specific robot to perform the picking and placing, the assignment being dependent on the value representing a need for items.

That is, items may be distributed on the input conveyor based on predicted need on the output conveyors. Items to be picked are assigned to specific robots in a multi-robot system.

A computer program according to a second aspect may comprise software instructions that, when executed in a computer, performs the method according to the first aspect.

In a third aspect, there is provided a system comprising an input conveyor, an output conveyor, a pick and place robot and control circuitry, the system being configured such that it is capable of determining available picking positions on an input conveyor at which a respective item can be picked, determining available placing positions on an output conveyor at which a respective item can be placed, calculating, for the available picking positions and the available placing positions, a respective picking time and placing time, and instructing the at least one robot to pick items at the picking positions and place the items at the placing positions in an order determined by the respective picking times and placing times.

In a fourth aspect, there is provided a pick and place robot configured to operate in such a pick and place system.

These further aspects provide corresponding effects and advantages as discussed above in connection with the first aspect.

BRIEF DESCRIPTION OF THE DRAWINGS

Embodiments will now be described with reference to the attached drawings, where.

DETAILED DESCRIPTION OF THE INVENTION

Figure 1:
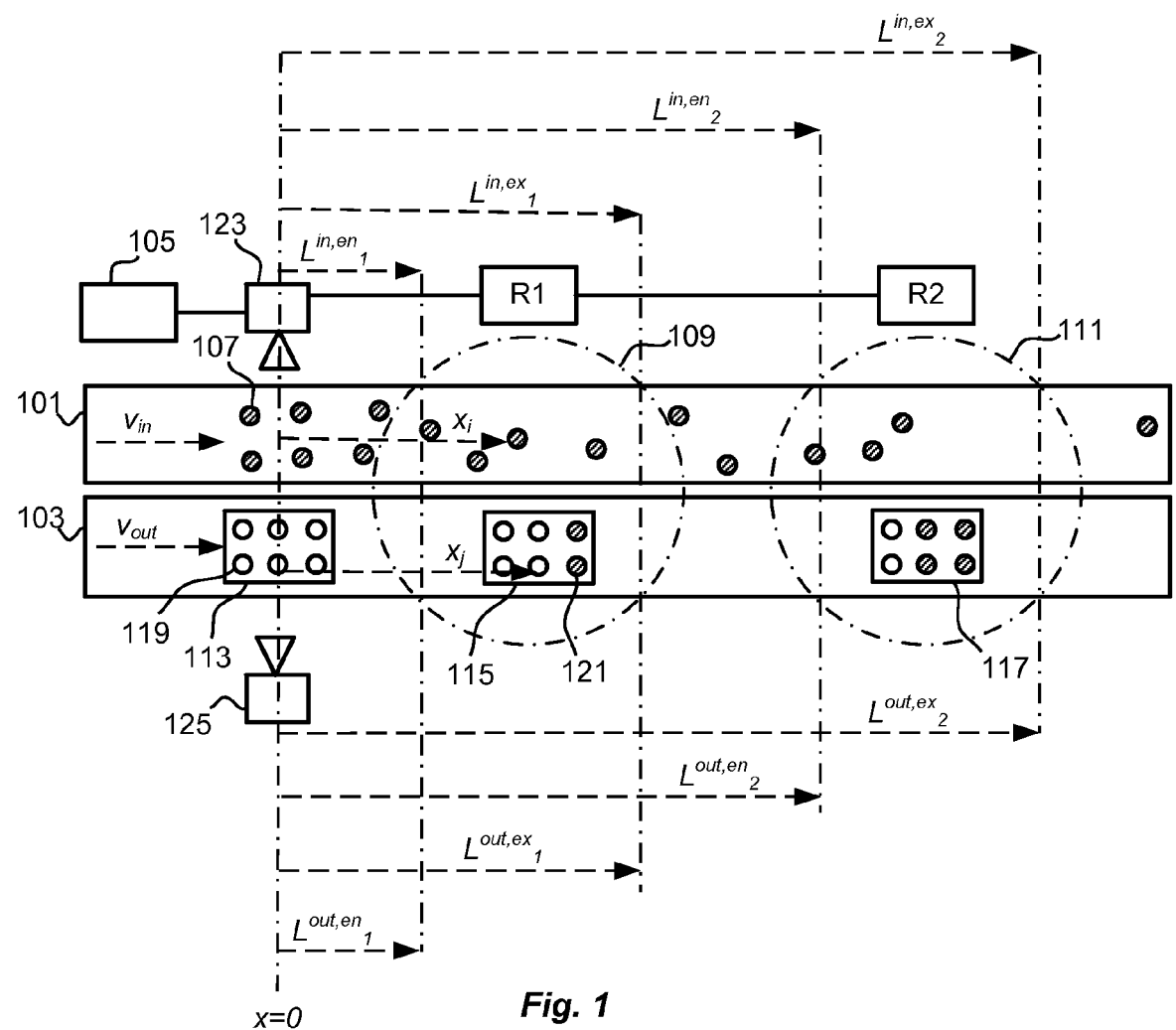
FIG. 1 schematically illustrates a pick and place system.

In FIG. 1, an input conveyor 101 conveys items 107 at a velocity $v_{in}$ such that the items 107 may enter working areas 109, 111 of pick and place robots R1 and R2, respectively. Within the working areas 109, 111 the items 107 may be picked by the robots R1 and R2 and placed on an output conveyor 103. In FIG. 1, the items 107 are placed in groups of six in boxes 113, 115 and 117, the boxes being conveyed at an output conveyor velocity $v_{out}$. FIG. 1 illustrates an instant in time when box 115 contains two placed items, one of which is indicated with numeral 121 and box 117 contains four placed items.

Each item 107, enumerated with an index i, is at a coordinate $x_i$ in relation to x=0 on the input conveyor 101 prior to being picked by any of the robots R1 and R2. On the output conveyor 103 positions at which items may be placed are enumerated with an index j, having a respective coordinate $x_j$ in relation to x=0.

The distance from x=0 at which an item on the input conveyor 101 for sure has entered the working area 109 of robot R1 is denoted by $L^{in,en}_1$ and the distance at which an item on the input conveyor 101 may have exited the working area 109 of robot R1 is denoted by $L^{in,ex}_1$. Similarly, the distance at which an item on the input conveyor 101 for sure has entered the working area 111 of robot R2 is denoted by $L^{in,en}_2$ and the distance at which an item on the input conveyor 101 may have exited the working area 111 of robot R2 is denoted by $L^{in,ex}_2$.

The distance from x=0 at which a placing position on the output conveyor 103 for sure has entered the working area 109 of robot R1 is denoted by $L^{out,en}_1$ and the distance at which a placing position on the output conveyor 103 may have exited the working area 109 of robot R1 is denoted by $L^{out,ex}_1$. Similarly, the distance at which a placing position on the output conveyor 103 for sure has entered the working area 111 of robot R2 is denoted by $L^{out,en}_2$ and the distance at which a placing position on the output conveyor 103 may have exited the working area 111 of robot R2 is denoted by $L^{out,ex}_2$.

An item detection unit 123 and a box detection unit 125 are connected to a processing unit 105. The processing unit 105 calculates, based on information from the detection units 123, 125, the coordinates $x_i$ of the items on the input conveyor 101 and the coordinates $x_j$ of the placing positions on the output conveyor, e.g. within the boxes 113, 115, 117. Information may be available regarding positions within the boxes where items may be placed. The robots R1 and R2 are also connected to the processing unit 105 and, as will be described in more detail below, the processing unit 105 calculates pick times and place times for each item that may be used when instructing the robots R1, R2 to pick and place the items.

Figure 2:
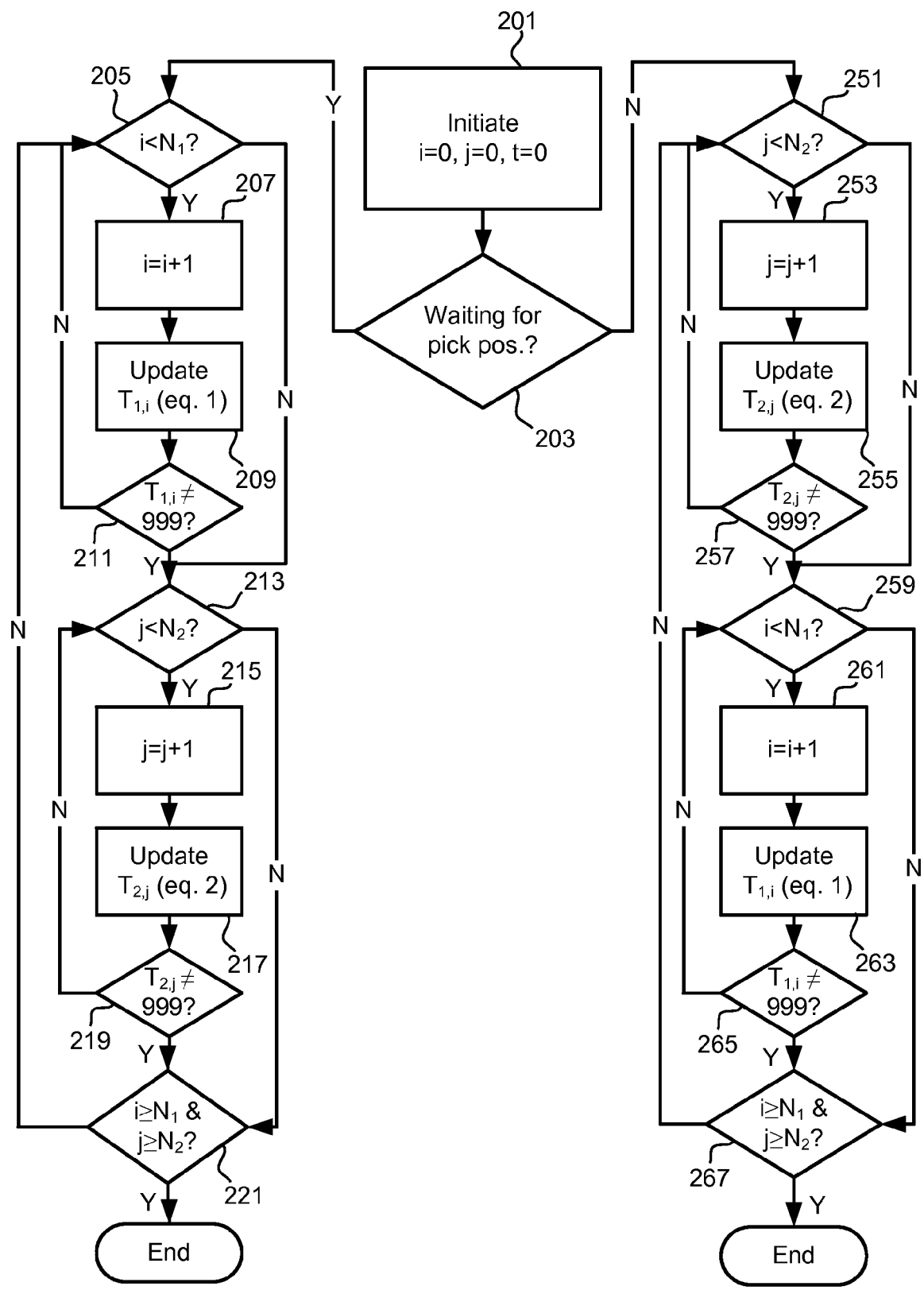
FIG. 2 is a flowchart of a pick and place algorithm.

Turning now to FIG. 2, a pick and place method will be described that provides advantages as summarized above. The method is described with reference to a single robot, e.g. any of the robots R1 and R2 in the system illustrated in FIG. 1. The robot receives picking positions and picking times as well as placing positions and placing times that determines the order in which items are to be picked and placed. The robot obtains the information from a processing unit that receives information regarding positions of items on an input conveyor and placing positions on an output conveyor from detection units, such as in the system illustrated in FIG. 1. The terminology introduced above will be used and picking times will be denoted by $T_{1,i}$ and placing times will be denoted by $T_{2,j}$. As the skilled person will realize, the calculations and control procedures may be performed in a processor such as the processor 105 in FIG. 1 or may be performed in similar processing units located within a robot. The method is continuously repeated as long as the detection units 123, 125 provides "batches" of $N_1$ picking positions $x_i$ and "batches" of $N_2$ placing positions $x_j$.

The method commences with an initiation step 201 in which i, j and the time t is set to zero.

If the robot is currently waiting for input of a picking position or is currently performing placing of an item, a sequence of steps 205 to 221 is performed. If the robot has received a picking position, a sequence of steps 251 to 267 is performed, as decided in a decision step 203.

During these sequences, steps 205 to 221 and 251 to 267, calculation of the picking times $T_{1,i}$ and the placing times $T_{2,j}$ are performed by using the following equations:

$$T_{1,i} = \begin{cases} T_{2,j} + T_{cycle}, & \text{if } L^{in,ent}_k < x_i(T_{2,j} + T_{cycle}) < L^{in,ex}_k \\ T_{2,j} + T_{cycle} + \Delta T(x_i(T_{2,j} + T_{cycle}), v_{in}, L^{in,ent}_k), \\ & \text{if } x_i(T_{2,j} + T_{cycle}) < L^{in,ent}_k \\ 999, & \text{if } x_i(T_{2,j} + T_{cycle}) > L^{in,ex}_k \end{cases} \quad (\text{Eq. 1})$$

$$T_{2,j} = \begin{cases} T_{1,i} + T_{cycle}, & \text{if } L^{out,ent}_k < x_j(T_{1,i} + T_{cycle}) < L^{out,ex}_k \\ T_{1,i} + T_{cycle} + \Delta T(x_j(T_{1,i} + T_{cycle}), v_{out}, L^{out,ent}_k), \\ & \text{if } x_j(T_{1,i} + T_{cycle}) < L^{out,ent}_k \\ 999, & \text{if } x_j(T_{1,i} + T_{cycle}) > L^{out,ex}_k \end{cases} \quad (\text{Eq. 2})$$

where:
$$\Delta T(x, v, L) = \frac{L - x}{v}$$
$$x_i(t) = x_i(0) + v_{in} * t, \; x_j(t) = x_j(0) + v_{out} * t$$
$$T_{1,0} = T_{2,0} = 0$$

The parameter $T_{cycle}$ is the robot cycle time for a pick and place operation and is hence a representation of the performance of the robot. The time value T=999 is used in the calculations to indicate that a picking position or placing position has exited the working area of the robot.

In the situation that the robot currently is waiting for input of a picking position or is currently performing placing of an item, steps 205 to 221 are performed. Using the terminology introduced above and with the use of equation 1, the picking time for the first available picking position is calculated. When the picking time for the first available picking position has been calculated, as decided in the decision step 211, the corresponding placing time for that item is calculated, as illustrated in steps 213 to 219 with the use of equation 2. When the placing time has been calculated, as decided in the decision step 219, a check is made whether all $N_1$ items and $N_2$ placing positions have been considered and a decision is made in the decision step 221 whether or not to repeat the determination of picking time and placing time for a subsequent item, as illustrated by the return of flow to step 205.

In the situation that the robot has received a picking position, steps 251 to 267 are performed. Using the terminology introduced above and with the use of equation 2, the placing time for the first available placing position is calculated. When the placing time for the first available placing position has been calculated, as decided in the decision step 257, the next picking time for an item is calculated, as illustrated in steps 259 to 265 with the use of equation 1. When the picking time has been calculated, as decided in the decision step 265, a check is made whether all $N_1$ items and $N_2$ placing positions have been considered and a decision is made in the decision step 267 whether or not to repeat the determination of placing time and picking time for subsequent items, as illustrated by the return of flow to step 251.

In some applications of the method described above, it may be desirable to ensure that specific groups of placing positions on the output conveyor never leave the pick and place system without being complete. An example is that of filling boxes of chocolates, where it is highly undesirable that partly empty boxes are delivered. A method will now be described with reference to the flowchart in FIG. 3, where boxes (i.e. groups of placing positions) are allowed to leave the pick and place system either as completely filled boxes or as completely empty boxes.

The method operates on information that is already available regarding placing positions and placing times for the items, as calculated during the execution of the method illustrated in FIG. 2. For example, the method that will be described below may run concurrently with the method described above and operate on one and the same list of information regarding picking and placing times etc. The same terminology as above will be used, with the addition of an index m, which denotes a placing index within each box or group. Each box has $N_{box}$ placing positions, for example six positions such as the boxes 113, 115 and 117 in the system illustrated in FIG. 1.

Figure 3:
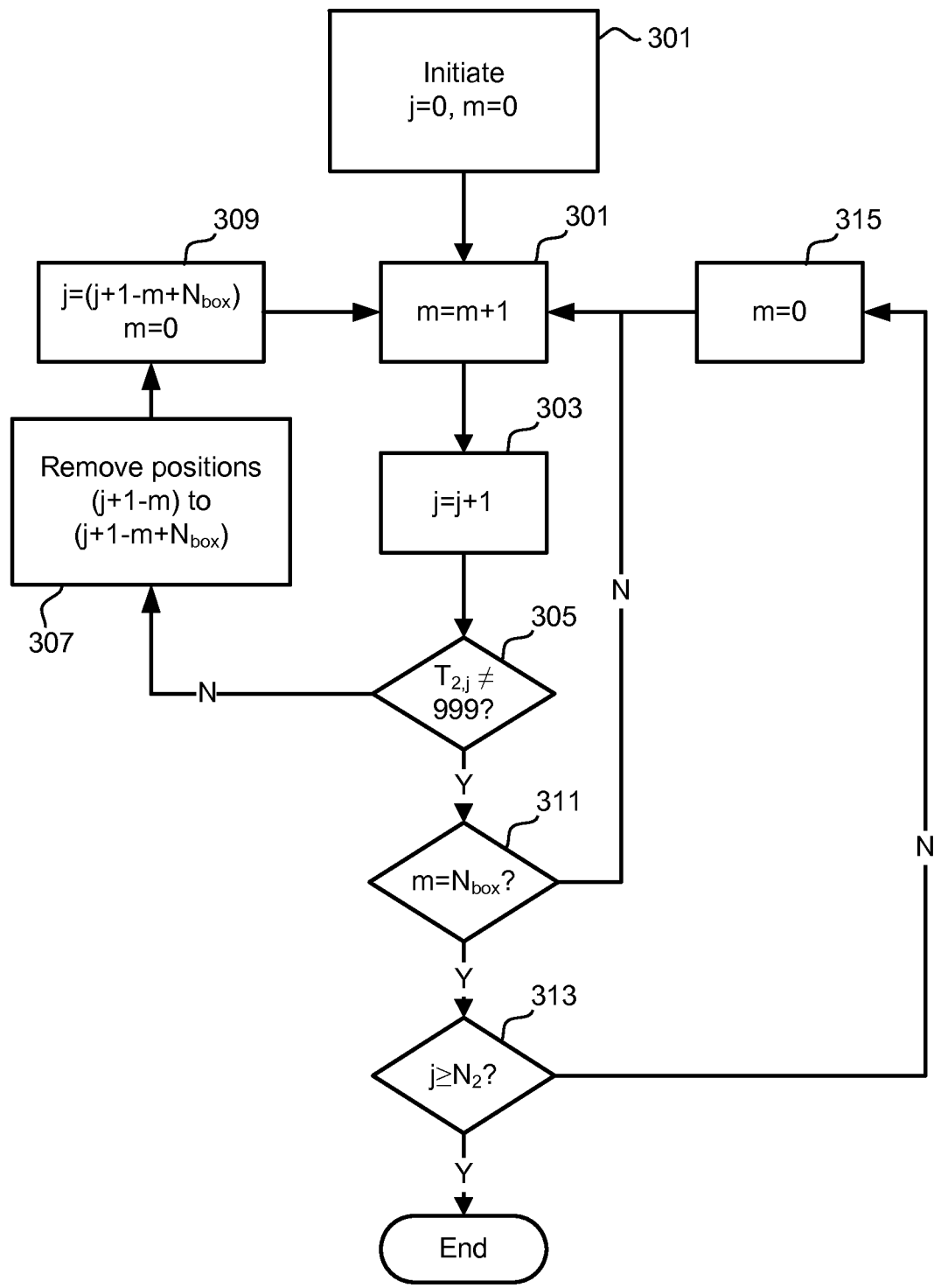
FIG. 3 is a flowchart of a pick and place algorithm.

Now with reference to the flowchart in FIG. 3, the method commences with initiation of j and m to a value of zero in an initiation step 301. All $N_2$ placing positions are then traversed in groups of $N_{box}$ positions as illustrated by steps 301, 303 311, 313 and 315. If a placing time of 999 is detected, i.e. an unavailable placing position is detected, a decision is made in a decision step 305 to remove all $N_{box}$ placing positions in the group of placing positions around the current placing position j. This removal is performed in a removal step 307 and is followed by a re-initiation step 309 where j is adjusted to a value pertaining to the subsequent box.

Some pick and place systems comprise a plurality of pick and place robots and a plurality of output conveyors, each output conveyor being associated with a respective robot. In such systems it may be necessary to control the distribution of pick and place tasks between the different robots in such a way that the need for items on each output conveyor is taken into account during the control.

Figure 4:
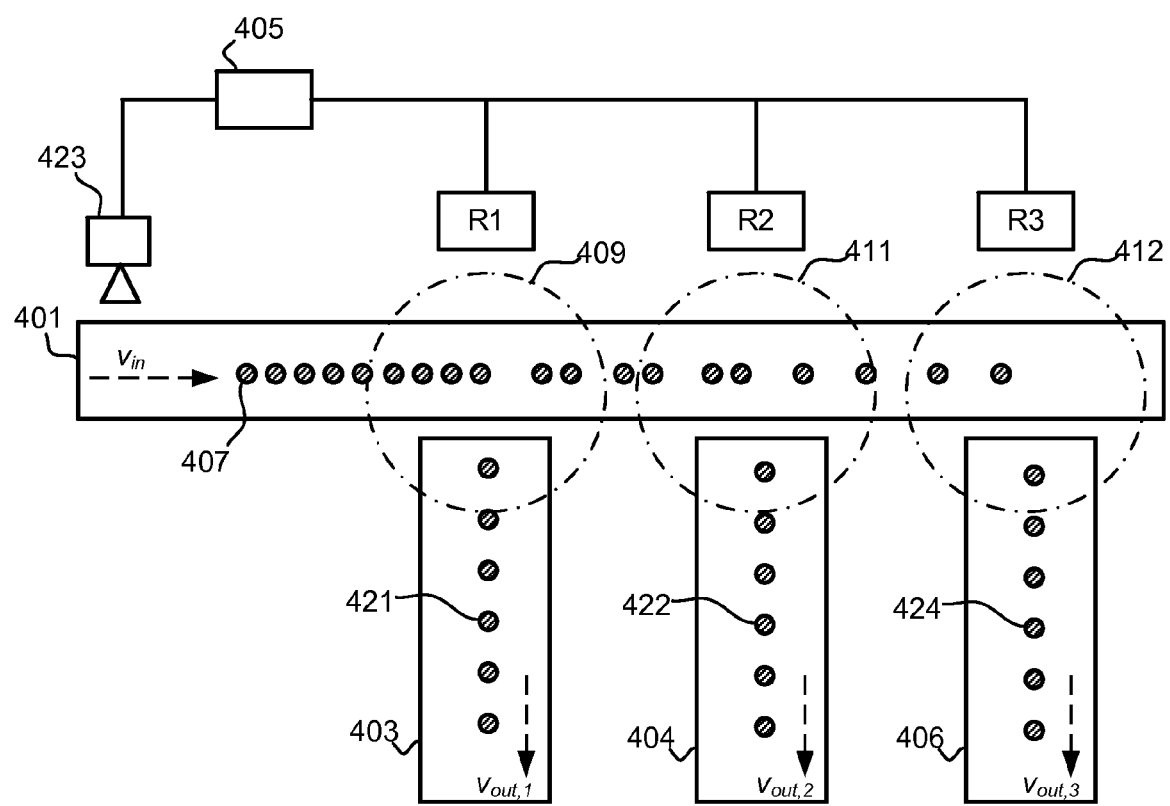
FIG. 4 is schematically illustrates a pick and place system.

FIG. 4 schematically illustrates such a multi robot/output conveyor system. Similar to the system illustrated in FIG. 1, an input conveyor 401 conveys items 407 at an input conveyor velocity v, into working areas 409, 411, 412 of pick and place robots R1, R2 and R3, respectively. The robots R1, R2 and R3 are, together with an item sensor 423, connected to a processing unit 405. Each robot R1, R2 and R3 is configured to pick items 407 from the input conveyor 401 and place picked items 421, 422, 424 on a respective output conveyor 403, 404 and 406. Each output conveyor 403, 404 and 406 conveys the placed items 421, 422, 424 at a respective output conveyor velocity $v_{out,1}$, $v_{out,2}$ and $V_{out,3}$.

In the method to be described below, the need for items on each output conveyor 403, 404 and 406 is quantified as the robot that can place an item fastest. However, it is to be understood that the need may be quantified in other terms, such as the time period passed since a robot has placed an item, whether or not the output conveyor is standing still, the time period an output conveyor has been standing still, etc. It is assumed that the items to be picked and placed are identified by detected positions as described above and that these items are stored in a list. As in the previous examples, the index i is the item picking index and j is the placing index, picking times will be denoted by $T_{1,i}$ and placing times will be denoted by $T_{2,j}$. As in the examples above, the picking times and the placing times are calculated with equations 1 and 2. The index m represents the robots among the $N_{robots}$ robots.

Figure 5:
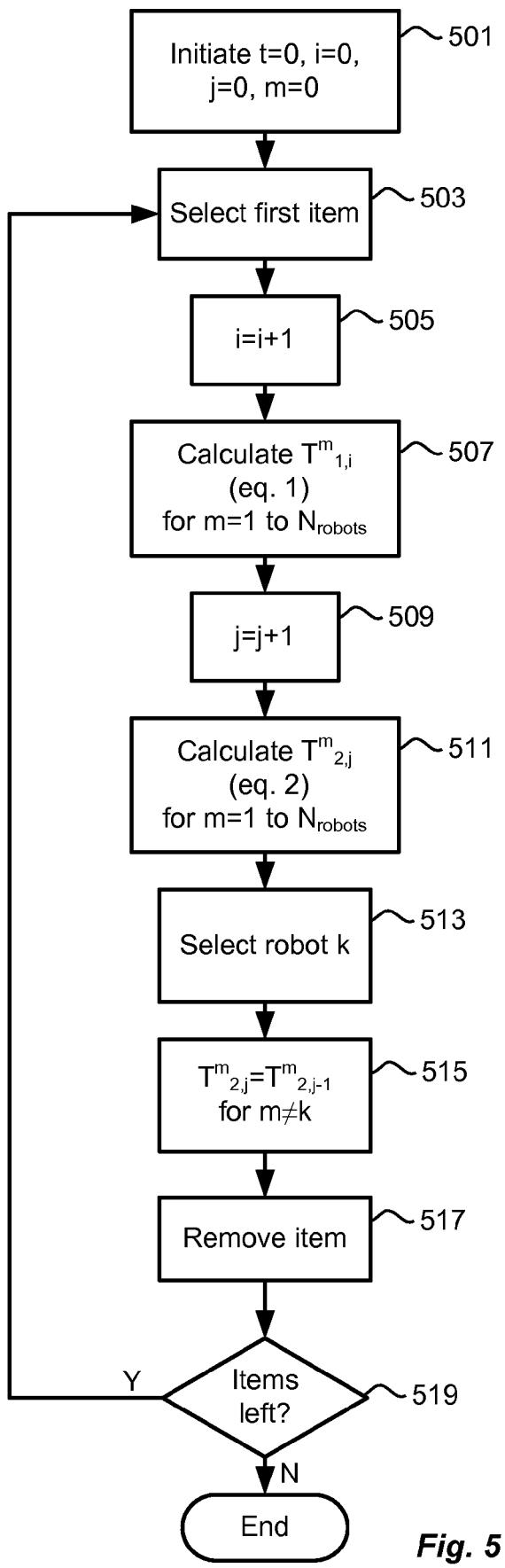
FIG. 5 is a flowchart of a pick and place algorithm.

Now with reference to FIG. 5, the method commences with an initiation step where the time t, i, j are set to zero, noting that the placing time for the first item for all $N_{robots}$ robots, i.e. $T^m_{2,0}$, is also zero as defined above. During steps 503, 505 and 507 the first item in the list is selected and picking times are calculated for each robot of the plurality of robots. Then, during steps 509 and 511, the placing time for the item is calculated for each robot.

In a selection step 513, the item is picked and placed by the robot that has the greatest need. The selection of which robot to assign the task of picking and placing is done by calculating the difference $T^m_{2,j} - T^m_{1,i}$. The robot k for which this difference is at a minimum and for which robot $T^m_{2,j} \neq 999$ is selected. If the calculated difference is equal for two or more robots, the robot for which $T^m_{2,j}$ is smallest is selected. If no $T^m_{2,j} \neq 999$ exists, the item is not distributed to any robot.

In a resetting step 515, the last placing time is reset for all robots that were not selected in the selection step 513. That is, $T^m_{2,j} = T^m_{2,j-1}$ for $m \neq k$.

The item that was distributed to a robot is then removed from the list of items in a removal step 517, and if there are items left, as checked in a checking step 519, a return is made to the selection step 503.

What is claimed is:

1. A method in a pick and place system, the system comprising at least one input conveyor, at least one output conveyor, at least one pick and place robot and control circuitry, said control circuitry having a processing unit, the method comprising:

determining, in said processing unit, available picking positions on the at least one input conveyor at which a respective item is or will be within a working area of the at least one pick and place robot and can be picked by the robot, determining, in said processing unit, available placing positions on the at least one output conveyor at which a respective item is or will be within a working area of the at least one pick and place robot and can be placed by the robot, identifying, in said processing unit, groups of placing positions on the at least one output conveyor, each group having a respective number of placing positions, and wherein the determination of available placing positions includes, for each group of placing positions, checking whether a placing position within the group is unavailable due to the placing position having exited, or will exit within a robot cycle time, a working area of the robot, and if found to be unavailable, defining all placing positions within the group as unavailable, calculating, in said processing unit, for the available picking positions and the available placing positions, a respective picking time by calculating a prediction of an instant in time when picking is to take place and a respective placing time by calculating a prediction of an instant in time when placing is to take place, and instructing, via said processing unit, the at least one pick and place robot to pick items at the picking positions and place the items at the placing positions in an order determined by the respective picking times and placing times.

2. The method of claim 1, wherein the calculation of picking time differs depending on if the robot is waiting for input of a picking position or has received a picking position, and the calculation of placing time differs depending on if the robot is waiting for input of a placing position or has received a placing position.

3. The method of claim 1, wherein:
the determination of available picking positions comprises predicting picking positions based on a velocity of movement of the input conveyor and a performance measure of the pick and place system.

4. The method of claim 1, wherein:
the determination of available placing positions comprises predicting placing positions based on a velocity of movement of the output conveyor and a performance measure of the pick and place system.

5. The method of claim 1, wherein a performance measure of the pick and place system is a picking and placing cycle time.

6. The method of claim 1, wherein the robot is only instructed to pick an item and place the item when there is or will be an available placing position.

7. The method of claim 1, wherein the checking whether a placing position within the group is unavailable is performed only for groups having placing positions that are not already used.

8. The method of claim 1, wherein the system comprises a plurality of pick and place robots, each robot being associated with a respective output conveyor, the method comprising:

calculating, for each robot, a value representing a need for items to be placed, said need being quantified as the robot that can place an item fastest, or as the time period passed since a robot has placed an item, or whether or not the output conveyor is standing still, or the time period an output conveyor has been standing still, for each item on the input conveyor, assign a specific robot to perform the picking and placing, the assignment being dependent on the value representing a need for items.

9. A computer-readable medium comprising software instructions that, when executed in a computer, perform a method in a pick and place system, the system comprising at least one input conveyor, at least one output conveyor, at least one pick and place robot and control circuitry, said computer being connected to said control circuitry and said control circuitry having a processing unit, the method comprising:

determining, in said processing unit, available picking positions on the at least one input conveyor at which a respective item is or will be within a working area of the at least one pick and place robot and can be picked by the robot, determining, in said processing unit, available placing positions on the at least one output conveyor at which a respective item is or will be within a working area of the at least one pick and place robot and can be placed by the robot, identifying, in said processing unit, groups of placing positions on the at least one output conveyor, each group having a respective number of placing positions, and wherein the determination of available placing positions includes, for each group of placing positions, checking whether a placing position within the group is unavailable due to the placing position having exited, or will exit within a robot cycle time, a working area of the robot, and if found to be unavailable, defining all placing positions within the group as unavailable, calculating, in said processing unit, for the available picking positions and the available placing positions, a respective picking time by calculating a prediction of an instant in time when picking is to take place and a respective placing time by calculating a prediction of an instant in time when placing is to take place, and instructing, via said processing unit, the at least one pick and place robot to pick items at the picking positions and place the items at the placing positions in an order determined by the respective picking times and placing times.

10. The computer-readable medium of claim 9, wherein the checking whether a placing position within the group is unavailable is performed only for groups having placing positions that are not already used.

11. The computer-readable medium of claim 9, wherein the system comprises a plurality of pick and place robots, each robot being associated with a respective output conveyor, the method comprising:

calculating, for each robot, a value representing a need for items to be placed, said need being quantified as the robot that can place an item fastest, or as the time period passed since a robot has placed an item, or whether or not the output conveyor is standing still, or the time period an output conveyor has been standing still, for each item on the input conveyor, assigning a specific robot to perform the picking and placing, the assignment being dependent on the value representing a need for items.

12. A pick and place system comprising at least one input conveyor, at least one output conveyor, at least one pick and place robot and control circuitry having a processing unit, the system being configured such that it is capable of:

determining, in said processing unit, available picking positions on the at least one input conveyor at which a respective item is or will be within a working area of the at least one pick and place robot and can be picked by the robot, determining, in said processing unit, available placing positions on the at least one output conveyor at which a respective item is or will be within a working area of the at least one pick and place robot and can be placed by the robot, identifying, in said processing unit, groups of placing positions on the at least one output conveyor, each group having a respective number of placing positions, and wherein the determination of available placing positions includes,
  for each group of placing positions, checking whether a placing position within the group is unavailable due to the placing position having exited, or will exit within a robot cycle time, a working area of the robot, and
  if found to be unavailable, defining all placing positions within the group as unavailable,
calculating, in said processing unit, for the available picking positions and the available placing positions, a respective picking time by calculating a prediction of an instant in time when picking is to take place and a respective placing time by calculating a prediction of an instant in time when placing is to take place, and
instructing, via said processing unit, the at least one pick and place robot to pick items at the picking positions and place the items at the placing positions in an order determined by the respective picking times and placing times.

13. The pick and place system of claim 12, wherein the checking whether a placing position within the group is unavailable is performed only for groups having placing positions that are not already used.

14. The pick and place system of claim 12 further comprising a plurality of pick and place robots, each robot being associated with a respective output conveyor, wherein the system is configured such that it is capable of:
  calculating, for each robot, a value representing a need for items to be placed, said need being quantified as the robot that can place an item fastest, or as the time period passed since a robot has placed an item, or whether or not the output conveyor is standing still, or the time period an output conveyor has been standing still,
  for each item on the input conveyor, assigning a specific robot to perform the picking and placing, the assignment being dependent on the value representing a need for items.

15. A pick and place robot configured to operate in a pick and place system, and comprising a processing unit that receives information and performs calculations and procedures according to a method in the pick and place system, the system comprising at least one input conveyor, at least one output conveyor, at least one pick and place robot and control circuitry, the method comprising:
  determining available picking positions on the at least one input conveyor at which a respective item is or will be within a working area of the at least one pick and place robot and can be picked by the robot,
  determining available placing positions on the at least one output conveyor at which a respective item is or will be within a working area of the at least one pick and place robot and can be placed by the robot,
  identifying groups of placing positions on the at least one output conveyor, each group having a respective number of placing positions, and wherein the determination of available placing positions includes,
    for each group of placing positions, checking whether a placing position within the group is unavailable due to the placing position having exited, or will exit within a robot cycle time, a working area of the robot, and
    if found to be unavailable, defining all placing positions within the group as unavailable,
  calculating, for the available picking positions and the available placing positions, a respective picking time by calculating a prediction of an instant in time when picking is to take place and a respective placing time by calculating a prediction of an instant in time when placing is to take place, and
  instructing the at least one pick and place robot to pick items at the picking positions and place the items at the placing positions in an order determined by the respective picking times and placing times.

16. The pick and place robot of claim 15, wherein the checking whether a placing position within the group is unavailable is performed only for groups having placing positions that are not already used.

17. The pick an place robot of claim 15, wherein the system comprises a plurality of pick and place robots, each robot being associated with a respective output conveyor, the method comprising:
  calculating, for each robot, a value representing a need for items to be placed, said need being quantified as the robot that can place an item fastest, or as the time period passed since a robot has placed an item, or whether or not the output conveyor is standing still, or the time period an output conveyor has been standing still,
  for each item on the input conveyor, assigning a specific robot to perform the picking and placing, the assignment being dependent on the value representing a need for items.

* * * * *